(12) United States Patent
Chen

(10) Patent No.: US 10,801,600 B2
(45) Date of Patent: Oct. 13, 2020

(54) ROLL-AND-PRESS FRICTION-DRIVING HARMONIC DRIVE GEAR REDUCER

(71) Applicant: Feng-Tien Chen, Taichung (TW)

(72) Inventor: Feng-Tien Chen, Taichung (TW)

(*) Notice: Subject to any disclaimer, the term of this patent is extended or adjusted under 35 U.S.C. 154(b) by 244 days.

(21) Appl. No.: 16/111,213

(22) Filed: Aug. 24, 2018

(65) Prior Publication Data
US 2019/0063579 A1 Feb. 28, 2019

(30) Foreign Application Priority Data
Aug. 28, 2017 (TW) .............................. 106129211 A

(51) Int. Cl.
*F16H 49/00* (2006.01)

(52) U.S. Cl.
CPC ..... *F16H 49/001* (2013.01); *F16H 2049/003* (2013.01)

(58) Field of Classification Search
CPC .......................... F16H 49/001; F16H 2049/003
See application file for complete search history.

(56) References Cited

U.S. PATENT DOCUMENTS

| | | | | |
|---|---|---|---|---|
| 2005/0014594 A1* | 1/2005 | Degen | ................... | F16H 49/001 475/163 |
| 2010/0288066 A1* | 11/2010 | Hirai | ..................... | F16H 49/001 74/416 |
| 2016/0084367 A1* | 3/2016 | Murayama | ............ | F16H 49/001 74/640 |
| 2018/0187763 A1* | 7/2018 | Xie | ........................ | F16H 49/001 |
| 2019/0247999 A1* | 8/2019 | Kataoka | ................. | B25J 9/1025 |

* cited by examiner

*Primary Examiner* — Terence Boes
(74) *Attorney, Agent, or Firm* — Leong C. Lei

(57) ABSTRACT

A roll-and-press friction-driving harmonic drive gear reducer includes: a wave generator having an elliptical external contour; a flexible spline having an output end and an open annular wall connected to the output end, the open annular wall having an external circumferential surface that includes an external roll-and-press area in an annular form, the external roll-and-press area including an annular section of external teeth adjacent to an end edge and a circumferential external curved surface adjacent to the annular external teeth; and a circular spline, which has an end that is recessed to form an accommodation hole that is inwardly extended, the accommodation hole having an internal circumferential surface that includes an internal roll-and-press area, the internal roll-and-press area including an annular section of internal teeth adjacent to an end edge and a circumferential internal curved surface adjacent to the set of internal teeth.

6 Claims, 17 Drawing Sheets

ROLL-AND-PRESS FRICTION-DRIVING HARMONIC DRIVE GEAR REDUCER

(a) TECHNICAL FIELD OF THE INVENTION

The present invention relates generally to a harmonic drive gear reducer, and more particularly to a roll-and-press friction-driving harmonic drive gear reducer.

(b) DESCRIPTION OF THE PRIOR ART

A known harmonic drive gear reducer 1, as shown in FIGS. 1-3, is made up of three major components, which are respectively a wave generator 2, a flexible spline 3, and a circular spline 4. The wave generator 2 has a shape that is an ellipse that receives an input of a rotating torque. The flexible spline 3 has an open end that is formed with a thin wall that is readily deformable and has an external circumferential surface that is formed with an annular section of external teeth 5. The circular spline 4 is provided, on an internal circumferential surface, with an annular section of internal teeth 6. The wave generator 2 is inserted into the flexible spline 3 such that the open end of the flexible spline 3 is deformed by the shape of the wave generator 2 into an ellipse. The flexible spline 3 is disposed in the circular spline 4 to have a portion of the external teeth 5 of the flexible spline 3 mating a portion of the internal teeth 6 of the circular spline 4. When the wave generator 2 rotates, due to a difference in number between the external teeth 5 of the flexible spline 3 and the internal teeth 6 of the circular spline 4, particularly the number of the external teeth 5 of the flexible spline 3 being smaller than the number of the internal teeth 6 of the circular spline 4, an effect of output of high torque and reduced speed can be achieved. Additional details will not be provided herein, as they are well known in the art.

Although the known harmonic drive gear reducer 1 shows advantages of simple structure, small backlash, light weight, small size, high torque output, and high accuracy, the flexible spline 3 and the circular spline 4 must be made of specific steel materials of high fatigue strength in order to support the high torque output. This, however, significantly increases the fabrication cost of the entire device. In addition, in order to meet the requirement of high accuracy, the flexible spline 3 and the circular spline 4 must be made such that a width of the annular section of external teeth 5 and a width the annular section of internal teeth 6 are each a predetermined width for ensuring transmission with high accuracy. This, however, increases the difficulty of machining, and wearing may be easily generated between the external teeth 5 of the flexible spline 3 and the internal teeth 6 of the circular spline 4. Thus, in certain applications of the known harmonic drive gear reducer where no high torque output and high transmission accuracy are required, the device would suffer these problems of increased fabrication cost, difficult machining, and easy wearing.

SUMMARY OF THE INVENTION

In view of the above, to improve the drawbacks of the prior art that the prior art harmonic drive gear reducer has a high fabrication cost, is difficult in machining, and is easy to wear out, the present invention provides a roll-and-press friction-driving harmonic drive gear reducer, which mainly comprises: a wave generator, which has an elliptical external contour; a flexible spline, which has an output end and an open annular wall connected to the output end, the open annular wall having an external circumferential surface that comprises an external roll-and-press area in an annular form, the external roll-and-press area comprising an annular section of external teeth adjacent to an end edge and a circumferential external curved surface adjacent to the annular external teeth; and a circular spline, which has an end that is recessed to form an accommodation hole that is inwardly extended, the accommodation hole having an internal circumferential surface that comprises an internal roll-and-press area, the internal roll-and-press area comprising an annular section of internal teeth adjacent to an end edge and a circumferential internal curved surface adjacent to the set of internal teeth. The wave generator is inserted into the open annular wall of the flexible spline and the external contour of the wave generator is in abutting engagement with a portion of the internal circumferential surface of the open annular wall that corresponds, in position, to the external roll-and-press area so as to deform the external roll-and-press area of the flexible spline to show an elliptical external contour. The flexible spline is disposed in the accommodation hole of the circular spline and the external roll-and-press area of the flexible spline is set in abutting engagement with the internal roll-and-press area of the circular spline so that a portion of the annular section of external teeth and a portion of the annular section of internal teeth are in engagement with each other and a portion of the circumferential external curved surface and a portion of the circumferential internal curved surface abut each other.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 4-16, a roll-and-press friction-driving harmonic drive gear reducer 100 according to a first preferred embodiment of the present invention, which mainly comprises a wave generator 10, a flexible spline 20, and a circular spline 30.

Figure 1:
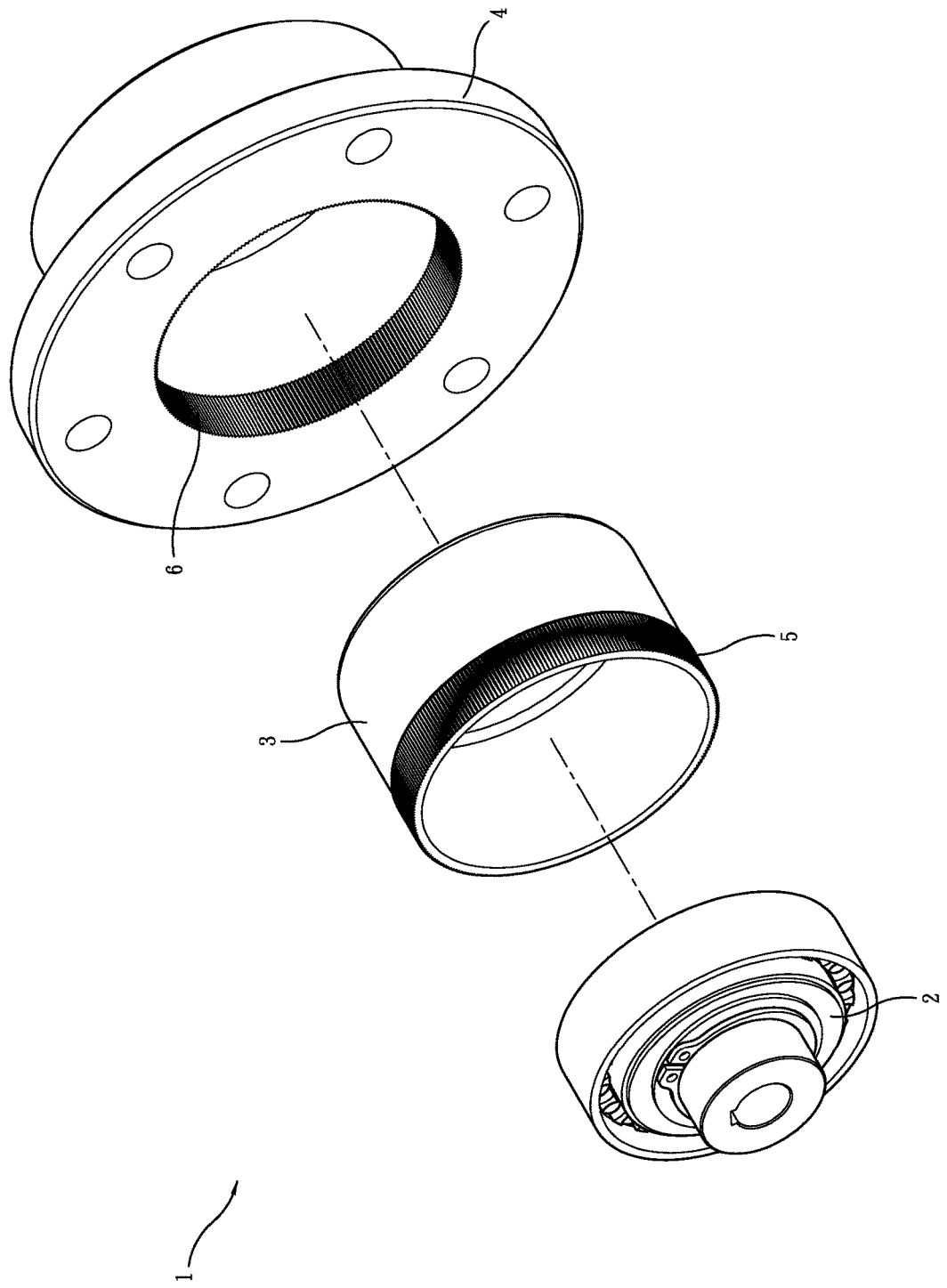
FIG. 1 is an exploded view showing a conventional harmonic drive gear reducer.
Figure 2:
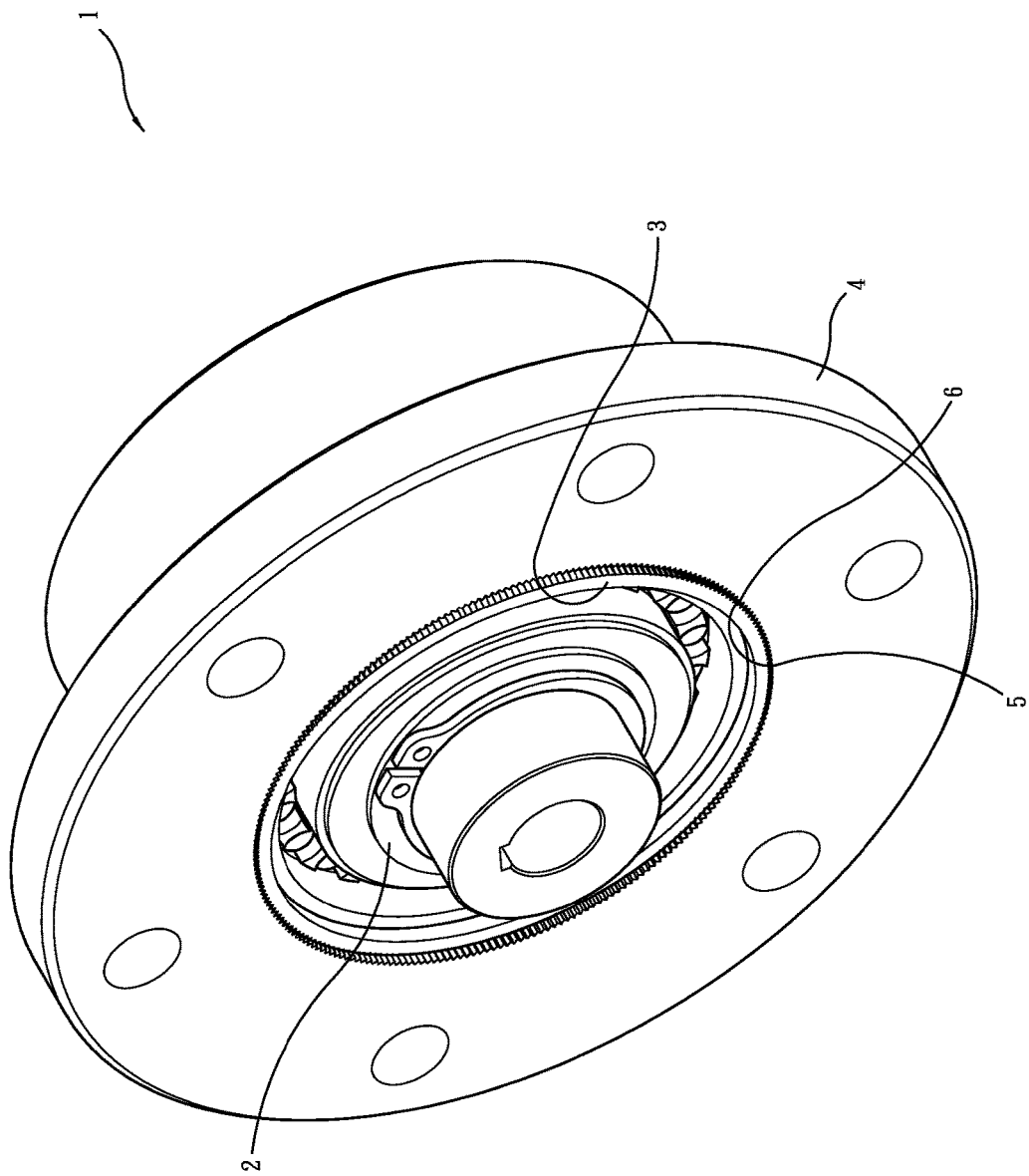
FIG. 2 is a perspective view, in an assembled form, showing the conventional harmonic drive gear reducer of FIG. 1.
Figure 3:
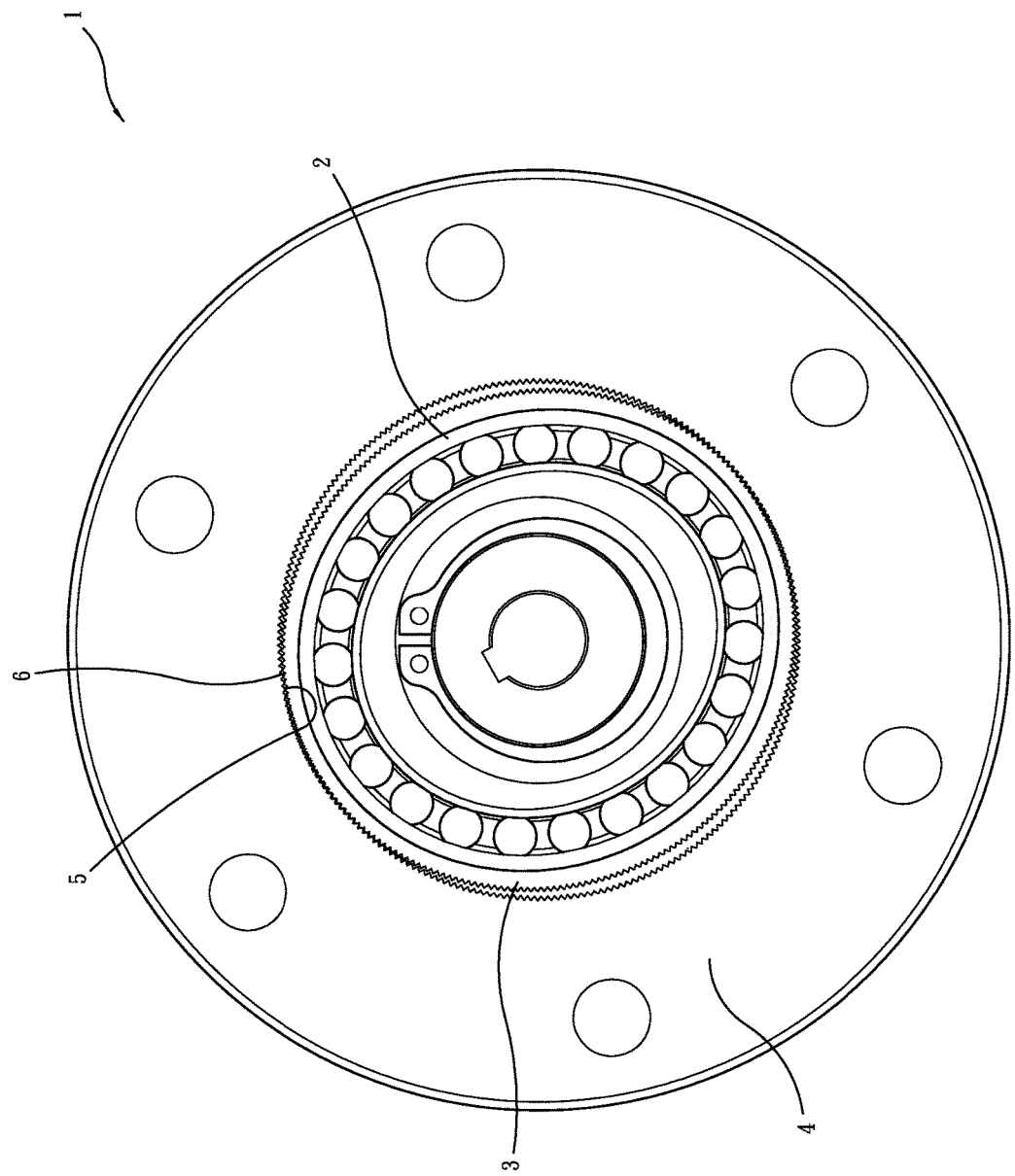
FIG. 3 is a front view showing the conventional harmonic drive gear reducer of FIG. 1.
Figure 4:
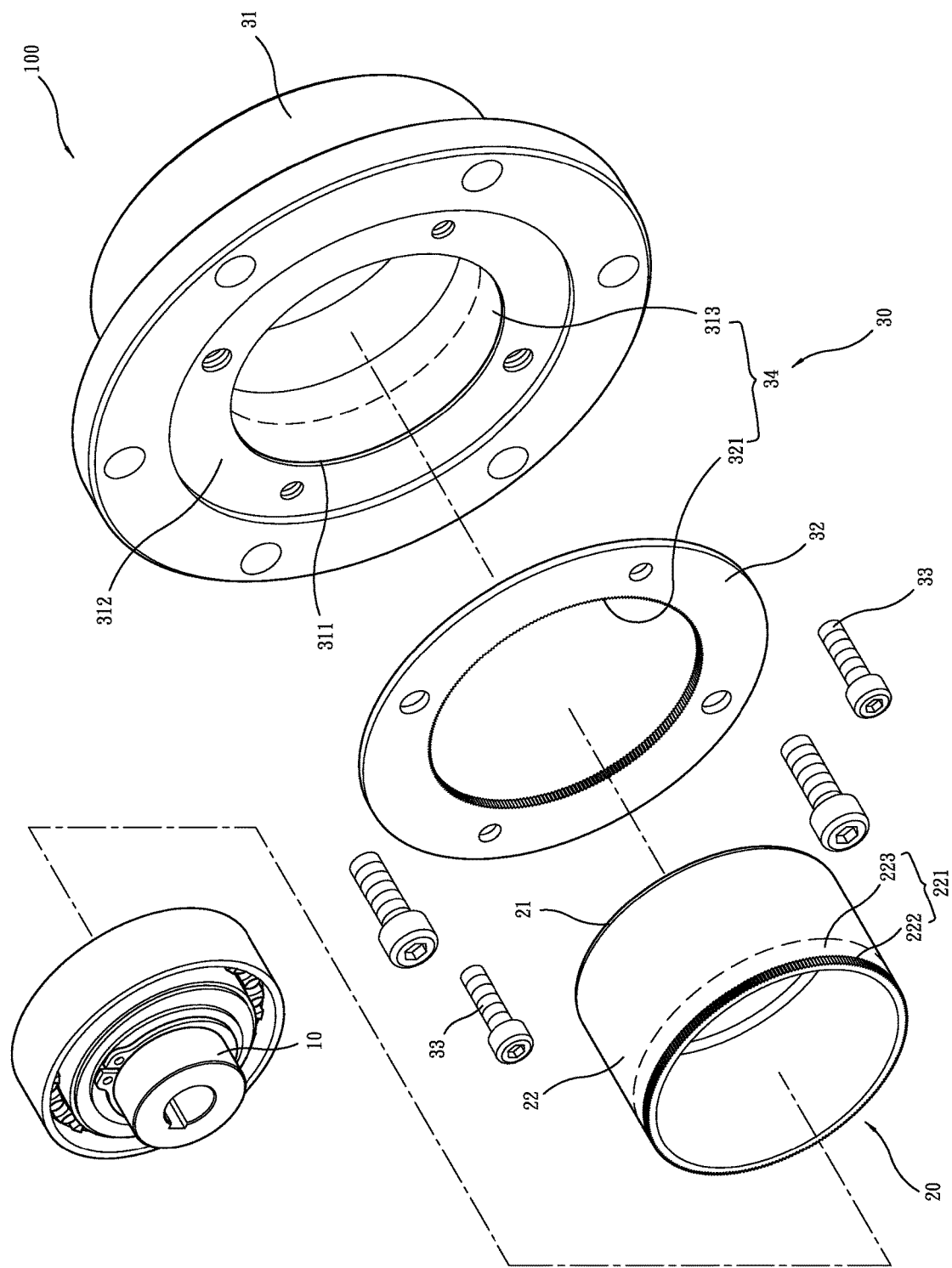
FIG. 4 is an exploded view of a first embodiment of the present invention.
Figure 5:
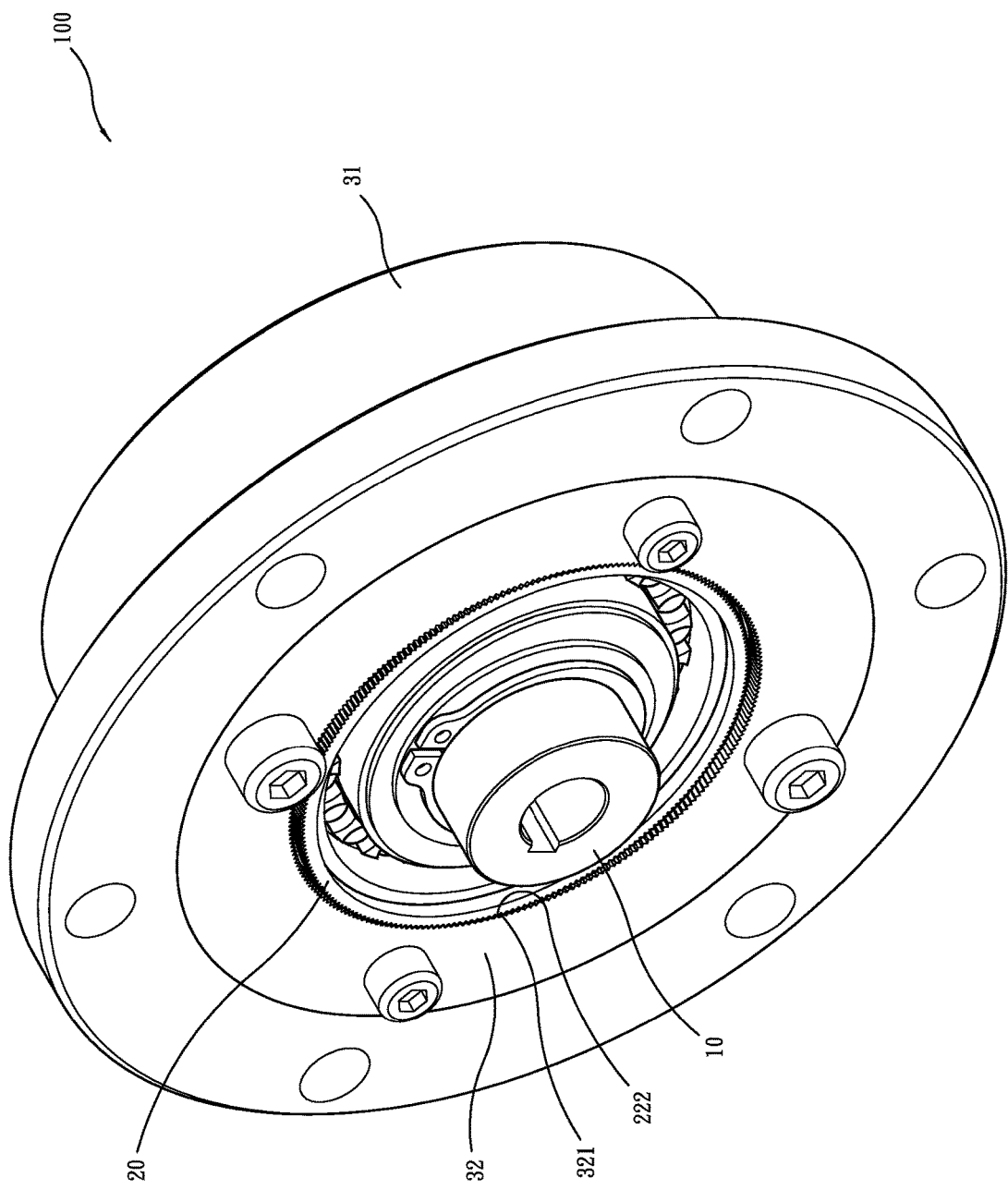
FIG. 5 is a perspective view, in an assembled form, of the embodiment of the present invention shown in FIG. 4.
Figure 6:
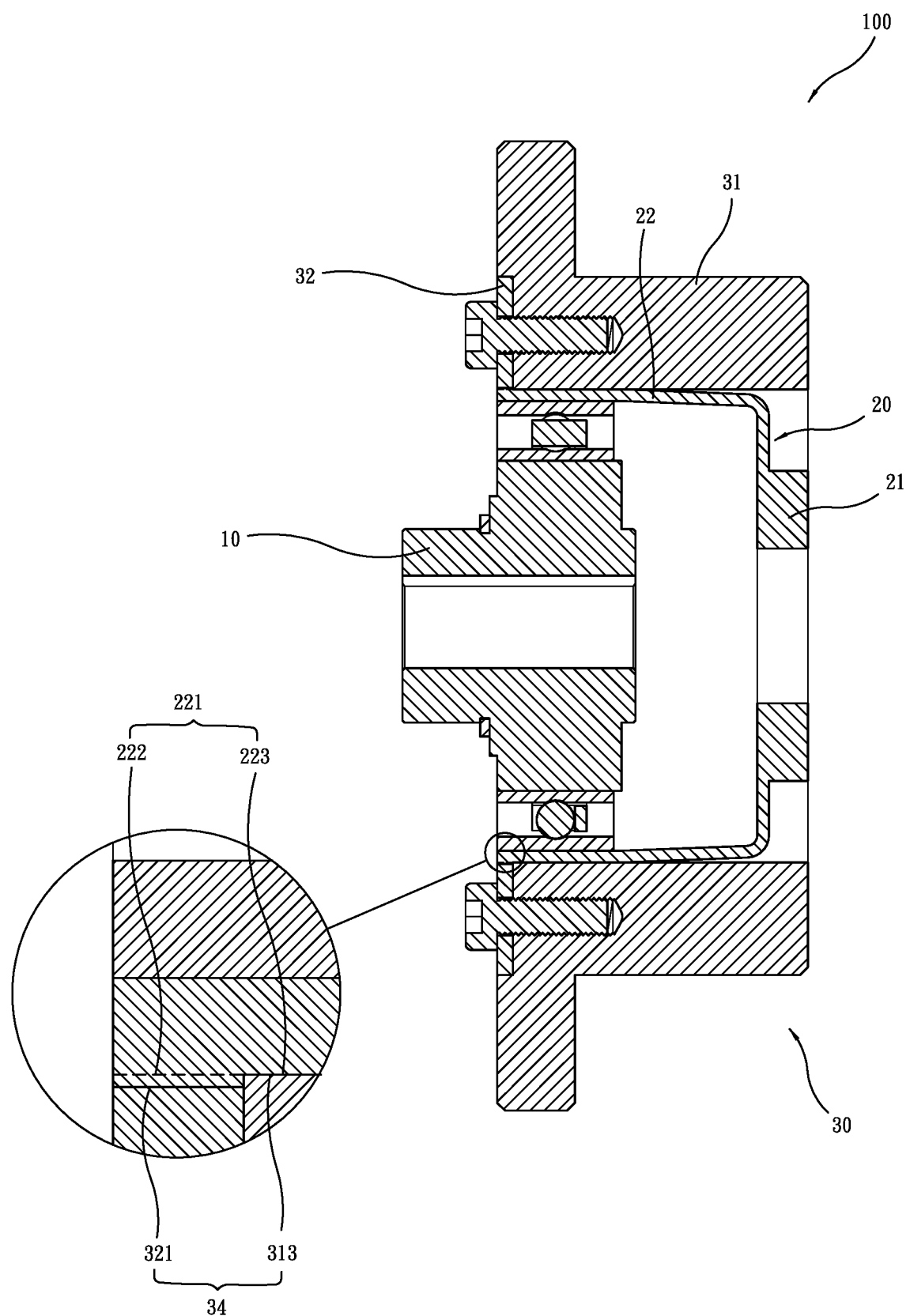
FIG. 6 is a cross-sectional view, together with an enlarged view of a part thereof, of the embodiment of the present invention shown in FIG. 4.
Figure 7:
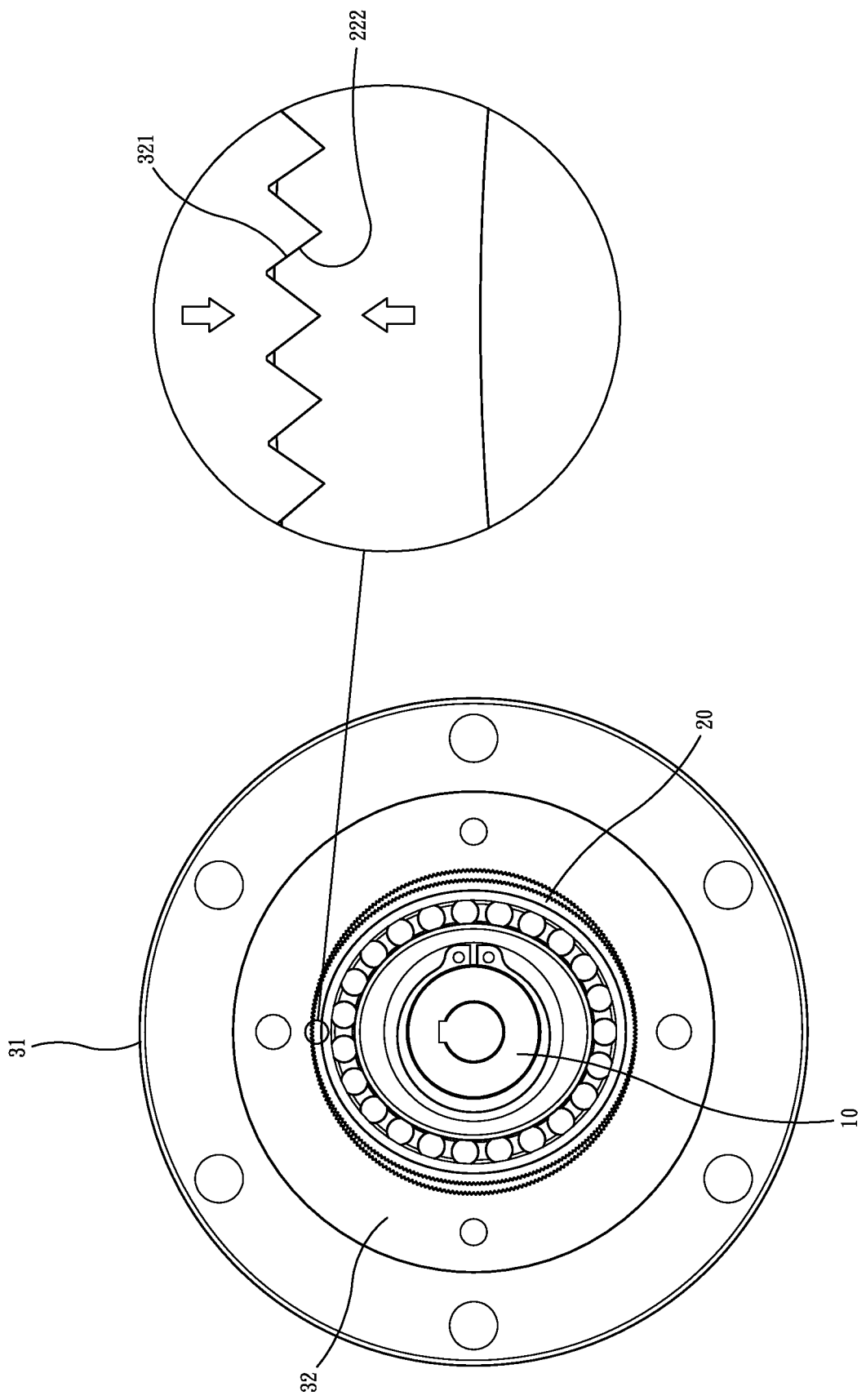
FIGS. 7-16 are schematic views showing an operation of the embodiment of the present invention shown in FIG. 4.
Figure 8:
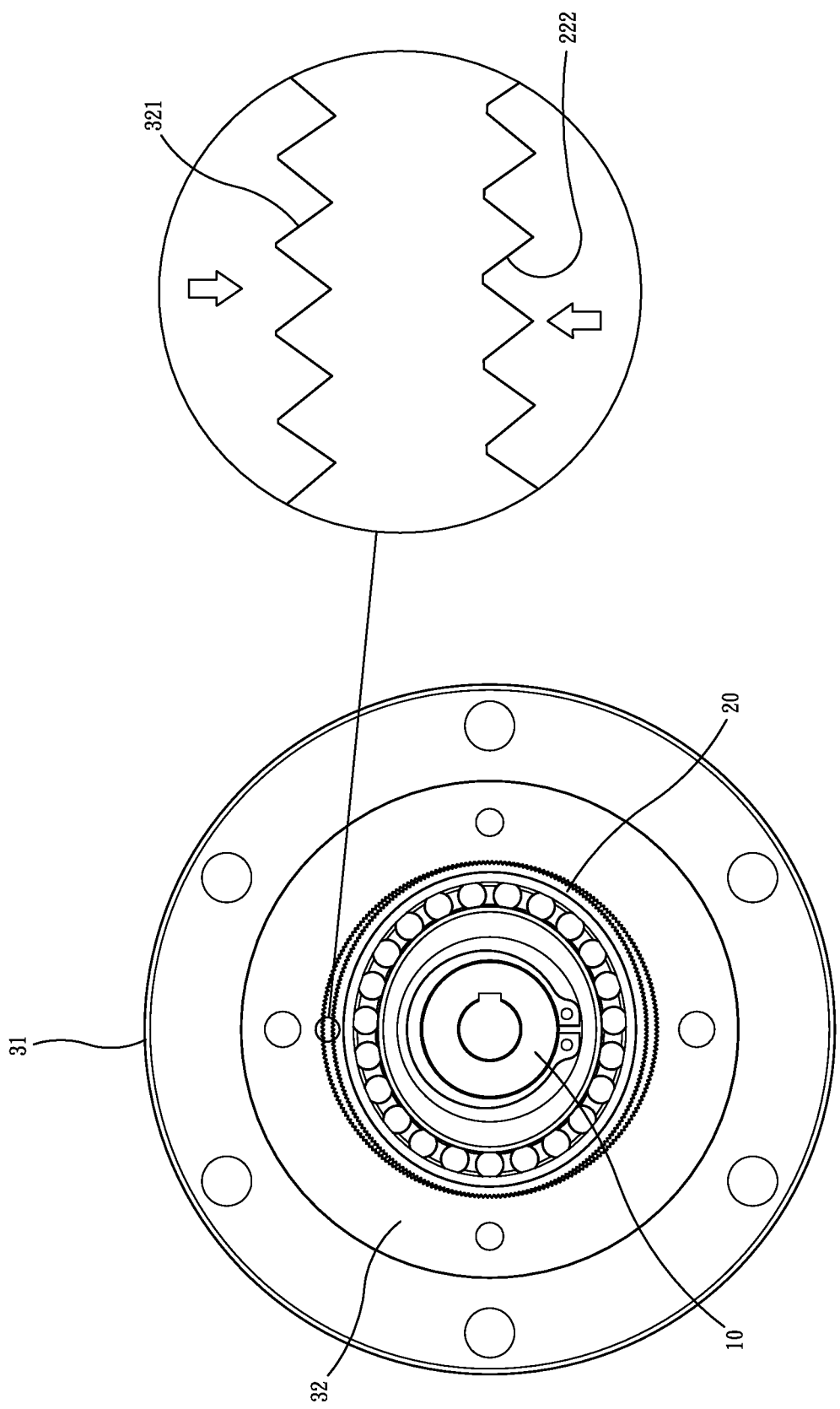
Figure 9:
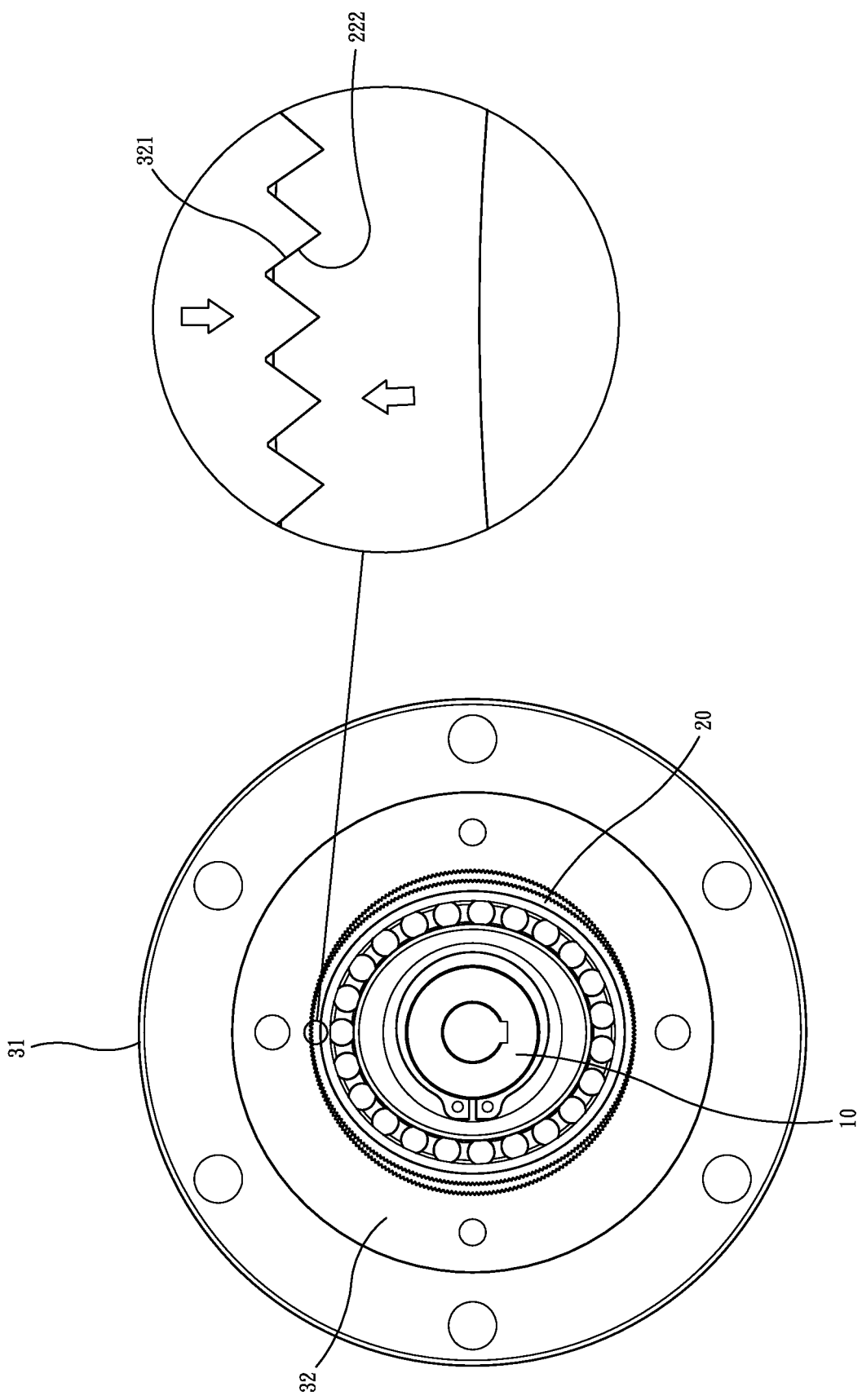
Figure 10:
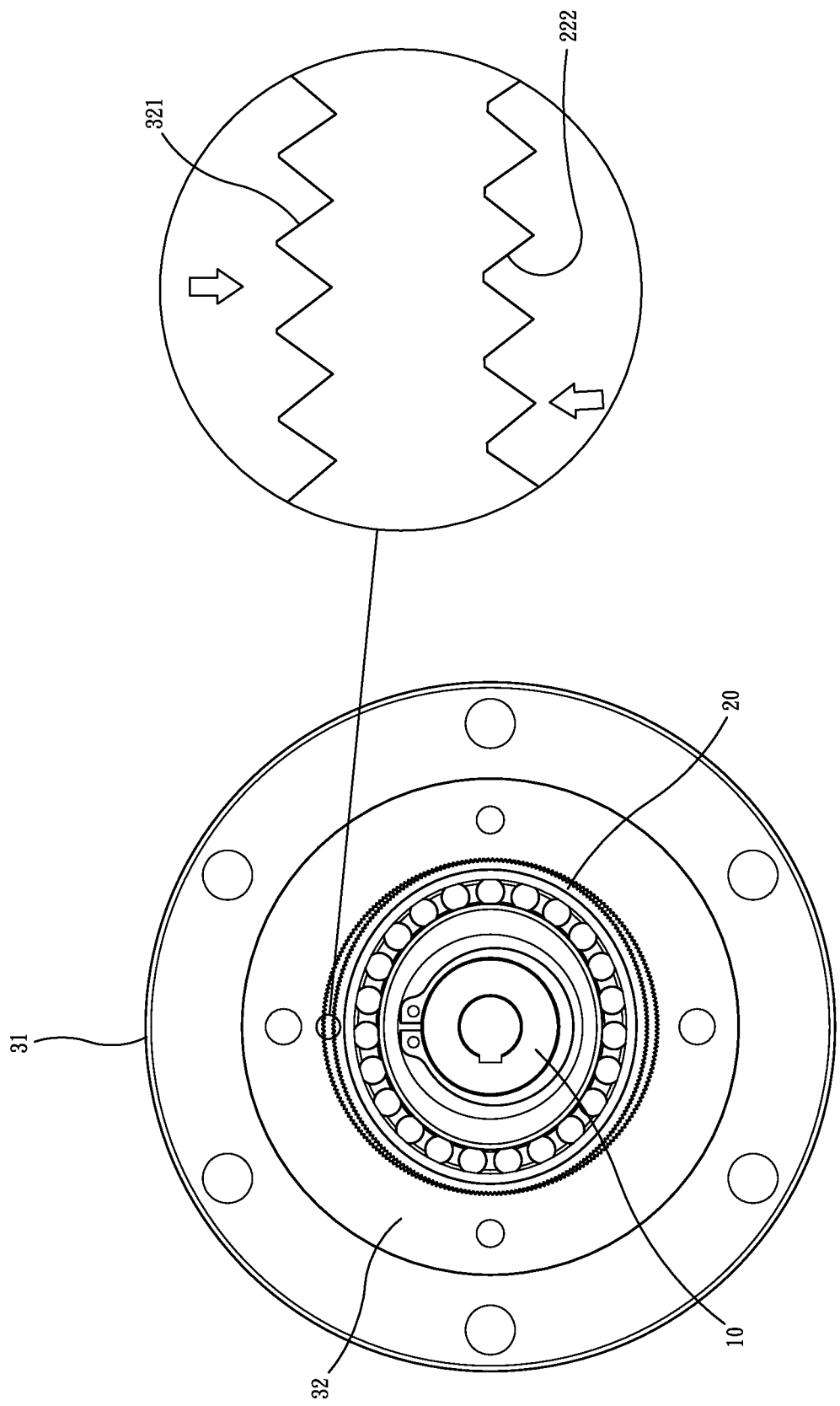
Figure 11:
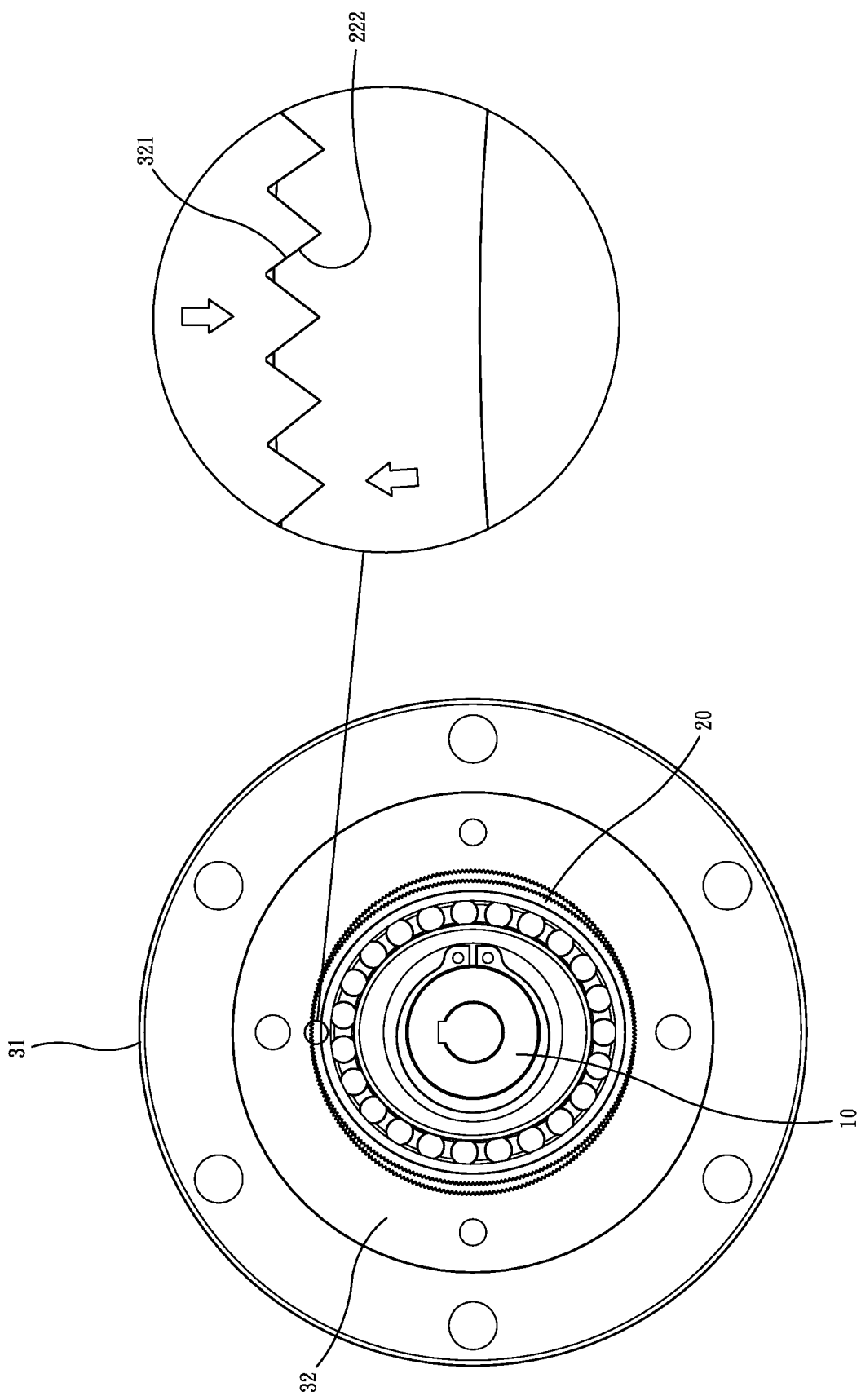
Figure 12:
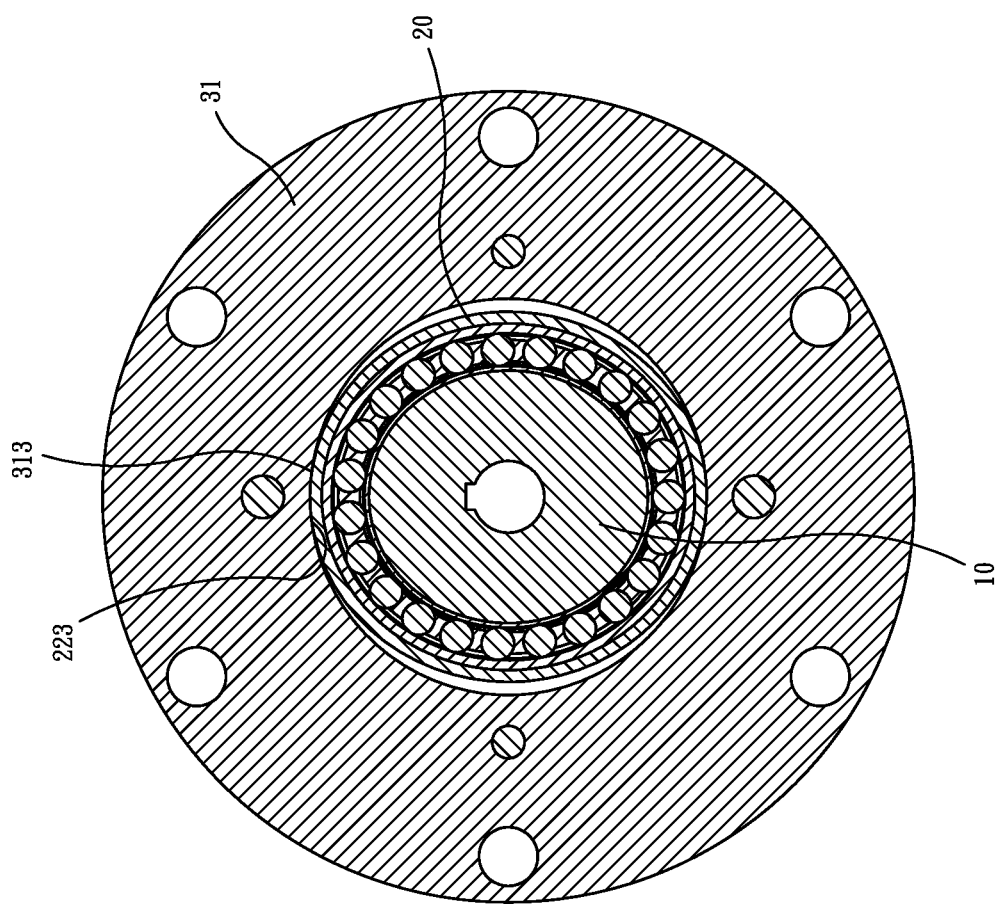
Figure 13:
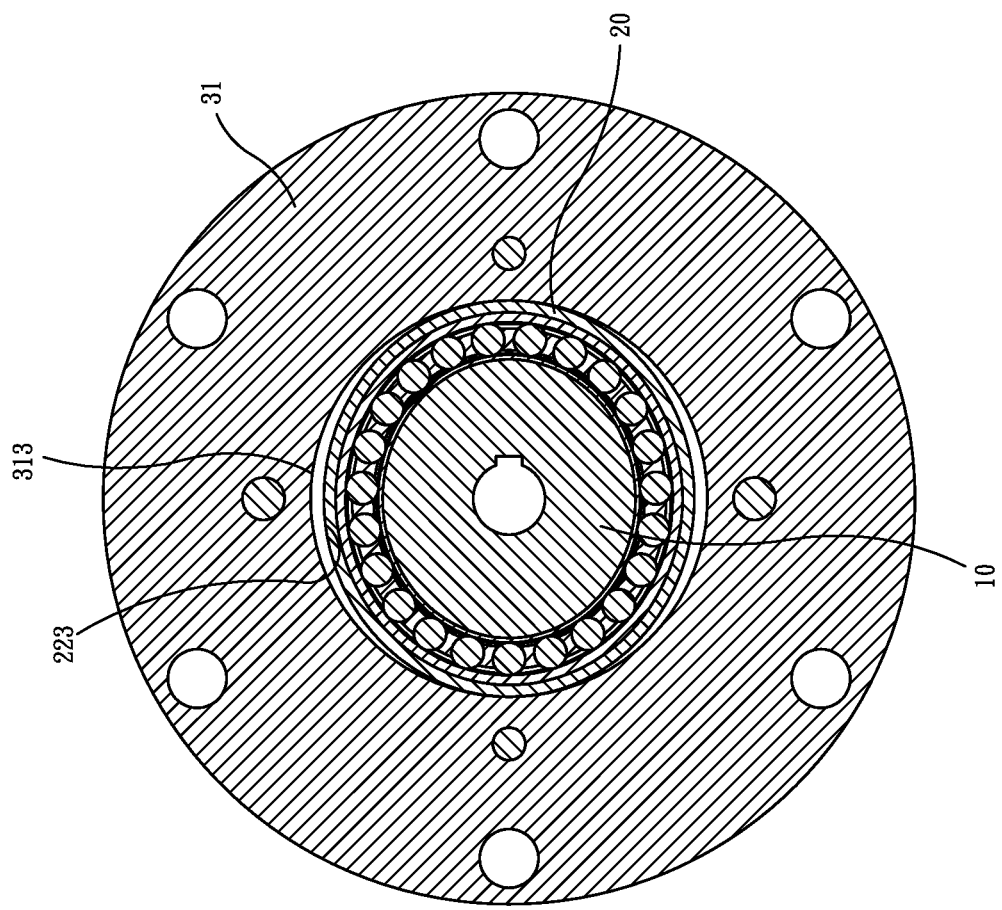
Figure 14:
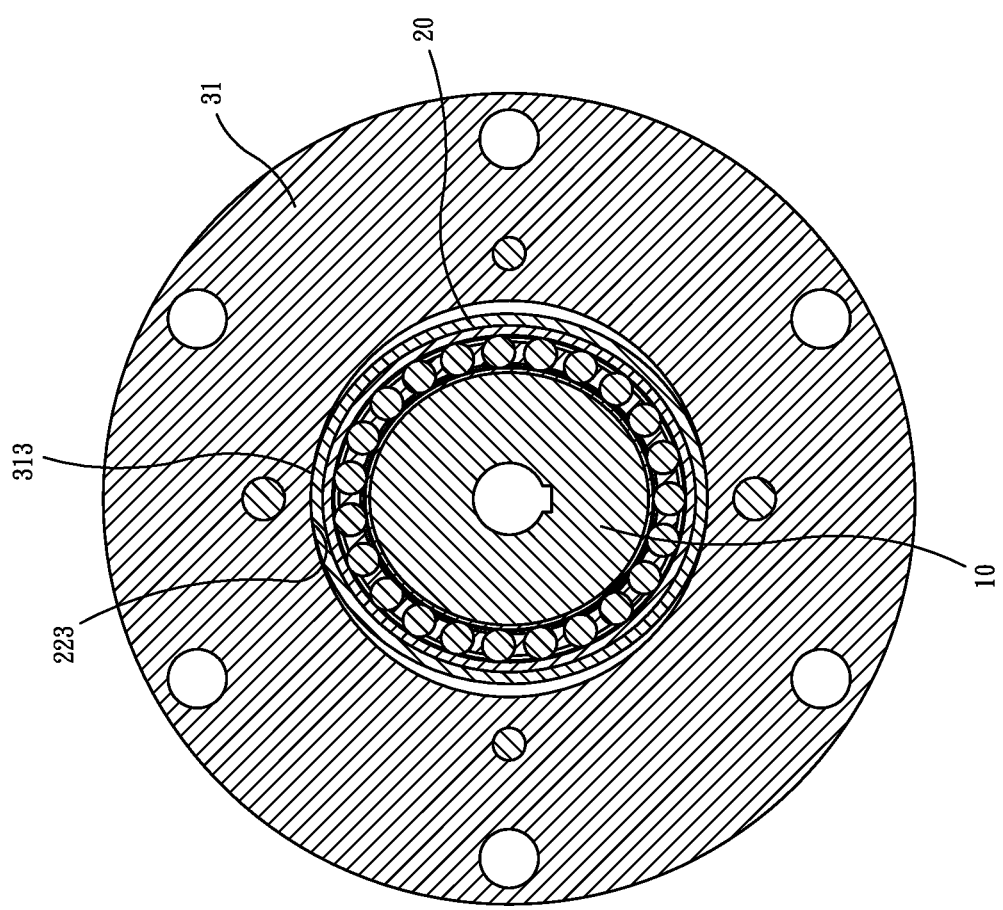
Figure 15:
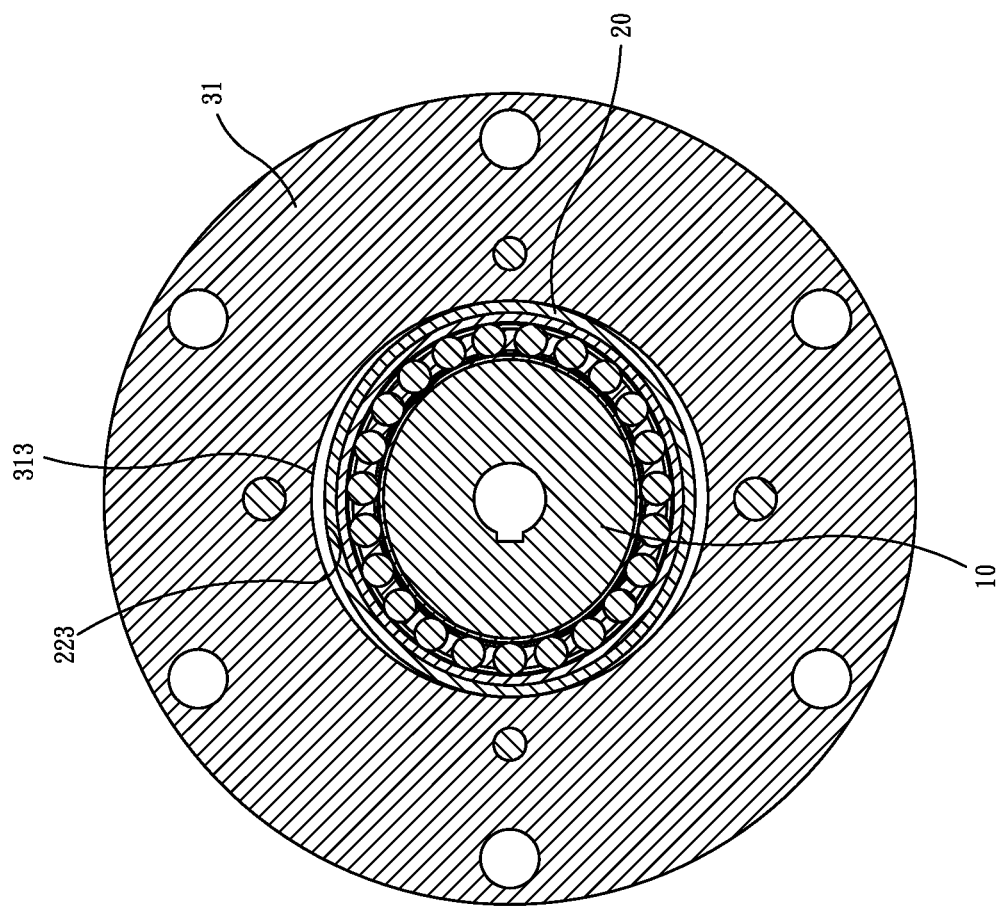
Figure 16:
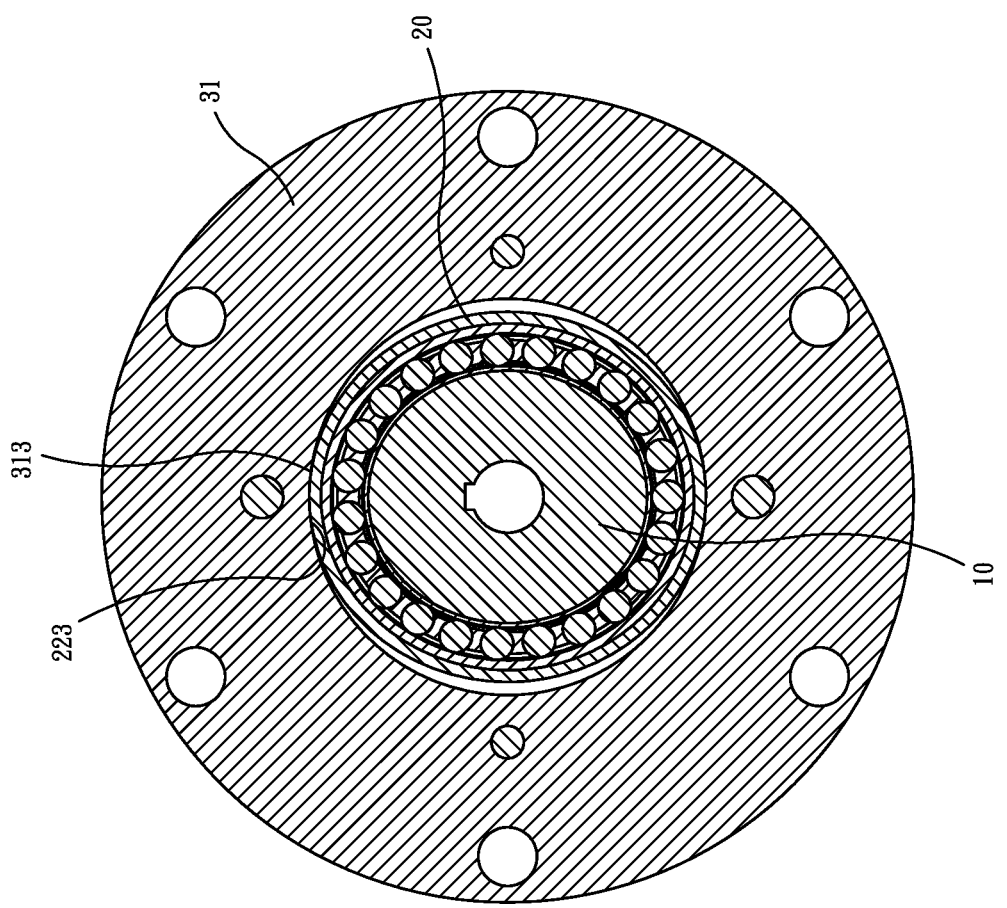

Referring to FIGS. 4-6, the wave generator 10 has an elliptical external contour for input of a rotating power.

Referring to FIGS. 4-6, the flexible spline 20 has an output end 21 and an open annular wall 22 integrally extending from a circumference of the output end 21 in an axial direction. The open annular wall 22 has an external circumferential surface that is adjacent to a free end edge and is provided with an external roll-and-press area 221, in the form of a ring or annulus. The external roll-and-press area 221 comprises an annular section of external teeth 222 that is adjacent to the free end edge and a circumferential external curved surface 223 adjacent to the annular external teeth section 222. The circumferential external curved surface 223 is a continuous curved surface that is free of portions raised or recessed locally from the surface, namely a smooth surface.

Referring to FIGS. 4-6, the circular spline 30 comprises an annular seat 31 and an annular body 32. The annular seat 31 has an end that is recessed inwardly, in an axial direction, to form an accommodation hole 311 and a recessed area 312 that is formed in a circumference of the accommodation hole 311 and recessed inwardly. The accommodation hole 311 has an internal circumferential surface that is formed, at a portion thereof that is adjacent to the recessed area 312, as a circumferential internal curved surface 313. The circumferential internal curved surface 313 is a continuous curved surface that is free of portions raised or recessed locally from the surface, such as a smooth surface. The annular body 32 is fixed by a plurality of bolts 33 in the recessed area 312 of the annular seat 31. The annular body 32 has an internal circumferential surface that is provided with an annular section of internal teeth 321, such that the annular internal teeth section 321 and the circumferential internal curved surface 313 collectively form an internal roll-and-press area 34, which is in an annular form.

The wave generator 10 is received in the open annular wall 22 of the flexible spline 20. The external contour of the wave generator 10 is set in abutting engagement with a portion of an internal circumferential surface of the open annular wall 22 that corresponds, in position, to the external roll-and-press area 221 such that the external roll-and-press area 221 of the flexible spline 20 is caused to deform and show an elliptical external contour. The flexible spline 20 is received in the accommodation hole 311 of the circular spline 30, and the external roll-and-press area 221 of the flexible spline 20 is in abutting engagement with the internal roll-and-press area 34 of the circular spline 30. In other words, a portion of the annular external teeth 222 and a portion of the annular internal teeth 321 engage with each other and a portion of the circumferential external curved surface 223 and a portion of the circumferential internal curved surface 313 abut each other.

Thus, the above provides a description to components, as well as assembly thereof, of the roll-and-press friction-driving harmonic drive gear reducer 100 according to the first preferred embodiment of the present invention. A description to operation of the device will be provided below:

Firstly, referring to FIGS. 7-16, when the wave generator 10 inputs a rotating power, with the elliptical wave generator 10 providing, at two relatively higher portions thereof, pre-loading forces to a portion of the internal circumferential surface of open annular wall 22 that corresponds to the external roll-and-press area 221 of the flexible spline 20 and the internal roll-and-press area 34 of the circular spline and the relatively higher portions of the elliptical wave generator 10 abutting the internal circumferential surface of the open annular wall 22 at a location corresponding to the external roll-and-press area 221 of the flexible spline 20 and continuously rotating, the external roll-and-press area 221 of the flexible spline 20 is continuously deformed into an ellipse by following the rotation of the wave generator 10 so as to change the position of abutting engagement on the internal roll-and-press area 34 of the circular spline 30 to proceed with rotation, in a rolling and pressing fashion, in an opposite direction and thus, the output end 21 may generate an output with a reduced speed.

Thus, since in the embodiment of the present invention, the external roll-and-press area 221 of the flexible spline 20 is provided with the annular external teeth 222 only at a portion thereof and the internal roll-and-press area 34 of the circular spline 30 is provided with the annular internal teeth 321 only at a portion thereof so that a torque that can be transmitted through the engagement thereof is limited and is not allowed to be a large one so that the present invention may find applications in devices and mechanisms that require no output of large torque and in addition, the flexible spline 20 and the annular seat 31 of the circular spline 30 can be made of a steel material having a low fatigue strength or even an engineering plastic material to provide an effect of lowering down fabrication cost.

Further, in the external roll-and-press area 221 and the internal roll-and-press area 34 of the flexible spline 20 and the circular spline 30 that are in abutting engagement with each other, the circumferential external curved surface 223 and the circumferential internal curved surface 313 are provided, therebetween, an area and a width of contact that are both greater than an area and a width of contact between the annular external teeth 222 and the annular internal teeth 321 (namely in the external roll-and-press area 221, the circumferential external curved surface 223 has an area that takes a percentage greater than that of an area of the annular external teeth 222; and in the internal roll-and-press area 34, the circumferential internal curved surface 313 has an area that takes a percentage greater than that of an area of the annular internal teeth 321), and in the external roll-and-press area 221 of the flexible spline 20, a portion of the internal circumferential surface that corresponds to the annular external teeth 222 has a diameter that is slightly greater than a diameter of a portion of the internal circumferential surface that corresponds to the circumferential external curved surface 223, so that an acting force (the pre-loading force) induced in an operation of transmission through rolling and pressing has a major portion acting between the circumferential external curved surface 223 and the portion of the internal circumferential surface thereof and the circumferential internal curved surface 313, and consequently a force induced during the engagement between the annular external teeth 222 and the annular internal teeth 321 can be reduced to thereby provide an effect of reducing abrasion and wearing.

Further, since the external roll-and-press area 221 and the internal roll-and-press area 34 of the instant embodiment are respectively provided with the circumferential external curved surface 223 and the circumferential internal curved surface 313 to achieve transmission through rolling and pressing, a width of the annular external teeth 222 of the flexible spline 20 and a width of the annular internal teeth 321 of the circular spline 30 can be made shorter than those of a conventional harmonic drive gear reducer thereby providing an effect of easy machining.

Thus, the present invention is particularly applicable to devices, mechanism, robotic arms, robots, and the likes that require a torque output of a middle or low range.

Figure 17:
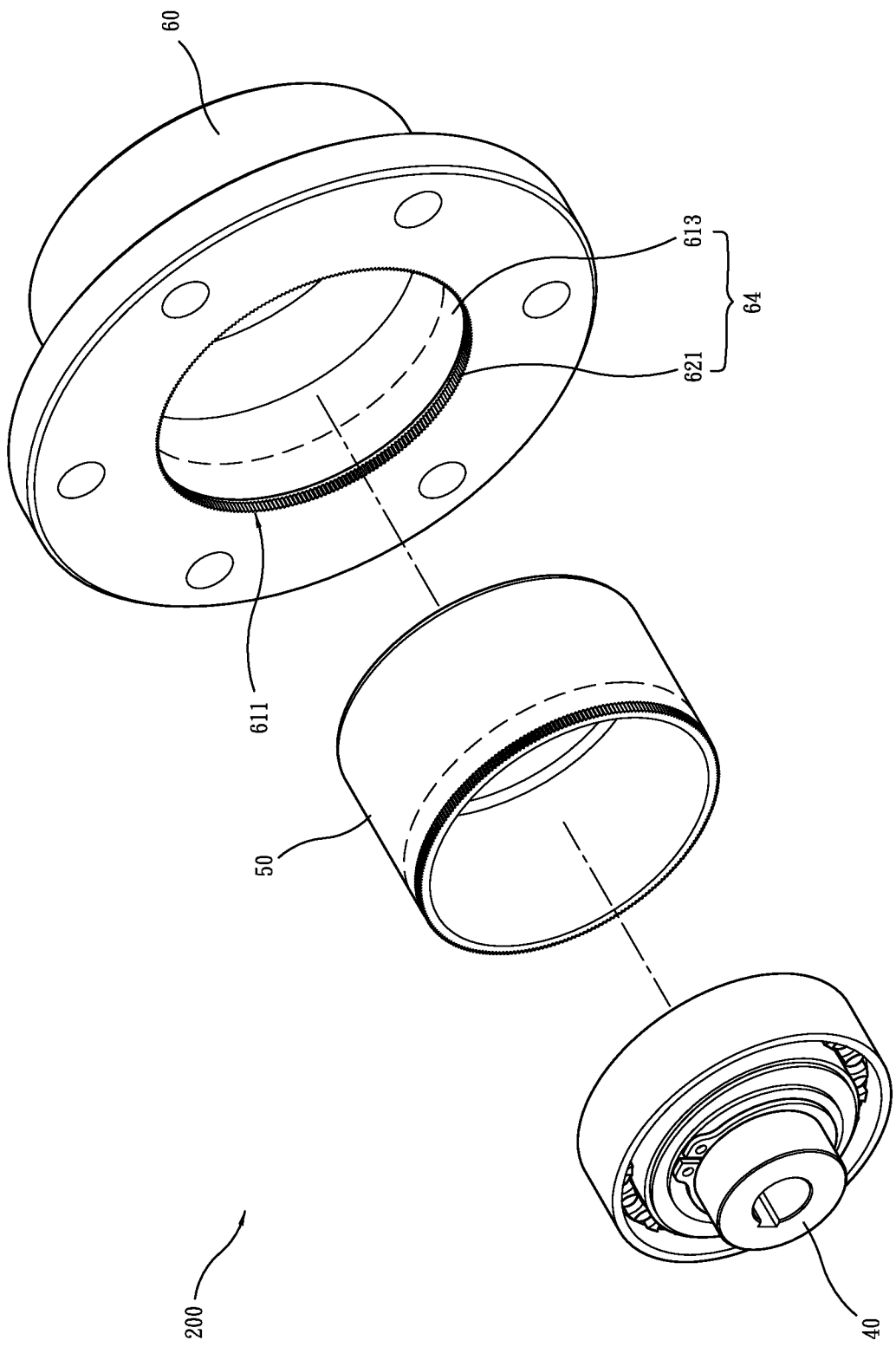
FIG. 17 is an exploded view of a second embodiment of the present invention.

Referring to FIG. 17, a roll-and-press friction-driving harmonic drive gear reducer 200 according to a second preferred embodiment of the present invention is shown, which, similar to the previous embodiment, comprises a wave generator 40, a flexible spline, 50 and a circular spline 60. A major difference is as follows.

In the instant embodiment, the circular spline 60 is an integrally formed unitary structure. In other words, a circumferential internal curved surface 613 of the internal roll-and-press area 64 and a section of annular internal teeth 621 are both formed on an internal circumferential surface of an accommodation hole 611. Although the circular spline 60 of the instant embodiment and the circular spline of the previous embodiment are slightly different, they both achieve a desired function.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A roll-and-press friction-driving harmonic drive gear reducer, mainly comprising:
a wave generator, which has an elliptical external contour;
a flexible spline, which has an output end and an open annular wall connected to the output end, the open annular wall having an external circumferential surface that comprises an external roll-and-press area in an annular form, the external roll-and-press area comprising an annular section of external teeth adjacent to an end edge and a circumferential external curved surface adjacent to the annular section of external teeth; and
a circular spline, which has an end that is recessed to form an accommodation hole that is inwardly extended, the accommodation hole having an internal circumferential surface that comprises an internal roll-and-press area, the internal roll-and-press area comprising an annular section of internal teeth adjacent to an end edge and a circumferential internal curved surface adjacent to the annular section of internal teeth;
wherein in the external roll-and-press area of the flexible spline, the circumferential external curved surface has a percentage of area greater than a percentage of area of the annular section of external teeth; and in the internal roll-and-press area of the circular spline, the circumferential internal curved surface has a percentage of area that is greater than a percentage of area of the annular section of internal teeth; and
wherein the wave generator is inserted into the open annular wall of the flexible spline and the external contour of the wave generator is in abutting engagement with a portion of the internal circumferential surface of the open annular wall that corresponds, in position, to the external roll-and-press area so as to deform the external roll-and-press area of the flexible spline to show an elliptical external contour, wherein the flexible spline is disposed in the accommodation hole of the circular spline and the external roll-and-press area of the flexible spline is set in abutting engagement with the internal roll-and-press area of the circular spline so that a portion of the annular section of external teeth and a portion of the annular section of internal teeth are in engagement with each other and a portion of the circumferential external curved surface and a portion of the circumferential internal curved surface abut each other.

2. The roll-and-press friction-driving harmonic drive gear reducer according to claim 1, wherein the open annular wall of the flexible spline is integrally formed with and extends from a circumference of the output end in an axial direction.

3. The roll-and-press friction-driving harmonic drive gear reducer according to claim 1, wherein the circular spline comprises an annular seat and an annular body, the accommodation hole being formed by a recess formed in and inwardly extended from an end of the annular seat in an axial direction, the annular seat being provided with a recessed area that is recessed inwardly from a circumference of the accommodation hole, the circumferential internal curved surface being located on a portion of the internal circumferential surface of the accommodation hole that is adjacent to the recessed area, the annular body being fixed in the recessed area of the annular seat, the annular section of internal teeth being arranged on an internal circumferential surface of the annular body.

4. The roll-and-press friction-driving harmonic drive gear reducer according to claim 1, wherein the circular spline is integrally formed as a unitary structure.

5. The roll-and-press friction-driving harmonic drive gear reducer according to claim 1, wherein in the external roll-and-press area of the flexible spline, a portion of the internal circumferential surface that corresponds to the annular section of external teeth has a diameter that is greater than a diameter of a portion of the internal circumferential surface that corresponds to the circumferential external curved surface.

6. The roll-and-press friction-driving harmonic drive gear reducer according to claim 1, wherein the circumferential external curved surface of the flexible spline is a continuous curved surface that is free of raised and recessed local parts and the circumferential internal curved surface of the circular spline is a continuous curved surface that is free of raised and recessed local parts.

* * * * *